United States Patent [19]

Balopole et al.

[11] 4,399,462

[45] Aug. 16, 1983

[54] VIDEO SPLIT SCREEN TECHNIQUE

[75] Inventors: Harvey L. Balopole, Whitestone; Thomas H. Traynor, Lindenhurst, both of N.Y.

[73] Assignee: Fairchild-Weston Systems Inc., Syosset, N.Y.

[21] Appl. No.: 230,182

[22] Filed: Jan. 30, 1981

[51] Int. Cl.³ ............................................. H04N 5/22
[52] U.S. Cl. ..................................... 358/183; 358/180
[58] Field of Search ................. 358/22, 180, 181, 183, 358/191.1, 182, 108, 134, 140

[56] References Cited

U.S. PATENT DOCUMENTS

| | | | |
|---|---|---|---|
| 3,982,063 | 9/1976 | Brown et al. | 358/134 |
| 4,139,860 | 2/1979 | Micic et al. | 358/183 |
| 4,266,242 | 5/1981 | McCoy | 358/183 |

Primary Examiner—John C. Martin
Attorney, Agent, or Firm—Thomas Langer

[57] ABSTRACT

A technique is provided for simultaneously displaying on a television screen juxtaposed pictures from two independent image sources. The required picture compression is achieved by storing analog samples of the video signals in an analog memory at one frequency and retrieving the samples at a higher frequency for display. A 2 to 1 picture compression is attained, for example, by retrieving the samples at twice the frequency at which they are stored.

11 Claims, 5 Drawing Figures

VIDEO SPLIT SCREEN TECHNIQUE

BACKGROUND OF THE INVENTION

This invention relates to a technique for video display and more particularly to a split screen display which is obtained by compressing independently derived images and juxtaposing them on the screen of a television monitor for simultaneous presentation.

Several approaches are known for simultaneously displaying two independently derived images on the same screen. One approach superimposes the two images. U.S. Pat. No. 3,569,966 and 4,001,499 are exemplary of this approach. Another approach is to juxtapose the two images for simultaneous display on the same screen. For some purposes superimposition is not desirable because the resulting picture would be meaningless or confusing. For example, the military requires a split screen display in its combat aircraft for training purposes. More specifically, training aircraft now employ a television camera in the cockpit which looks out of the windscreen at the view available to the pilot. In addition, it has within its field of view the heads-up display available in modern aircraft which presents important information to the pilot on the surface of the windscreen superimposed on the outside scene. In addition to the cockpit camera, the aircraft is equipped with radar. It is advantageous to the pilot, after he is back on the ground, to see the video outputs from the cockpit camera and the radar juxtaposed on the same screen. This enables him, as well as his instructor, to review and evaluate his actions and thereby learn from them.

Picture compression of what would otherwise cover the entire screen of a television monitor is obviously required in order to juxtapose the independently derived images on one screen. One technique accomplishes the picture compression by chopping off one or both sides of the picture and utilizes only the middle portion. Just enough of each picture is eliminated so that it, along with another similarly chopped picture, fit on the screen. This technique is useful when the eliminated portions of the picture are relatively unimportant, such as with separate views of the pitcher and base runner in a televised baseball game. The compressed picture eliminates part of the baseball field and other fielders from each picture but retains the most interesting elements, namely the pitcher and baserunner. However, for some cases such as in the combat aircraft environment discussed by way of example above, the entire picture is significant and, therefore, picture compression must be accomplished in some other manner. One solution has been to selectively eliminate the video information for a selected number of points along the raster scan line. U.S. Pat. No. 4,134,128 generates a given number of samples of the received analog television signal for conversion to digital form and subsequent storage in a digital memory. The stored information is then recalled and displayed. To compress the picture, every other sample of the digitized picture, for example, is eliminated and consequently not written into the memory. Thus, when the stored information is clocked out of the memory at the normal rate, a 2 to 1 picture compression is achieved. U.S. Pat. No. 4,152,719 and published U.K. pat. application Ser. No. 2,016,857 disclose alternative techniques for selectively storing less information than is available. Retrieval from memory at the normal rate then acts to suitably vary the picture size. U.S. Pat. No. 4,220,965, on the other hand, stores all the available information but, for retrieval from memory, addresses only selected memory locations. This, again, results in the use of a reduced number of digitized picture samples and provides picture compression dependent on the ratio of samples stored to samples retrieved.

Each of the above-mentioned techniques results in some information being lost from the detected image in the process of compressing the picture. This is particularly aggravated, of course, in the first-mentioned "chopping" approach. However, the second approach of eliminating selected digitized samples also can reduce resolution and picture quality. Futhermore, the latter approach requires A/D circuitry and a sizeable memory which add to the complexity, cost, size and weight of the apparatus yet still fail to retain in the compressed picture a significant portion of the detected image.

SUMMARY OF THE INVENTION

The primary object of the invention is to provide picture compression with a minimum loss of image information in the displayed picture.

Another object of the invention is to simplify the apparatus required to generate a compressed picture.

A further object of the invention is reduce the weight, size and cost of picture compression apparatus.

Still another object of the invention is to juxtapose two independently derived images for simultaneous display on one screen.

Yet another object of the invention is to provide picture compression apparatus to readily combine two independently derived images in juxtaposition on a screen flexible enough to handle a variety of image sources.

In order to accomplish these and other objects of the invention, one aspect of the invention is directed to an apparatus for producing horizontal compression of a raster scan television picture comprising a source of analog video signals; analog memory means coupled to said source for storing said video signals; timing means coupled to said analog memory means for storing said video signals in said analog memory means at a given frequency and for retrieving the stored video signals from said analog memory means at a frequency higher than said given frequency for input to a television monitor.

The compressed picture thus produced can be used to juxtapose two independently derived images on one screen. For example, each image can be compressed by two so both will have room on one screen. The invention thus further involves synchronization of the two sources, and control of the retrieval of stored samples such that one compressed picture appears for each first half of a scan line and the other compressed picture appears for the second half of the scan line.

DETAILED DESCRIPTION OF THE DRAWINGS

Figure 1:
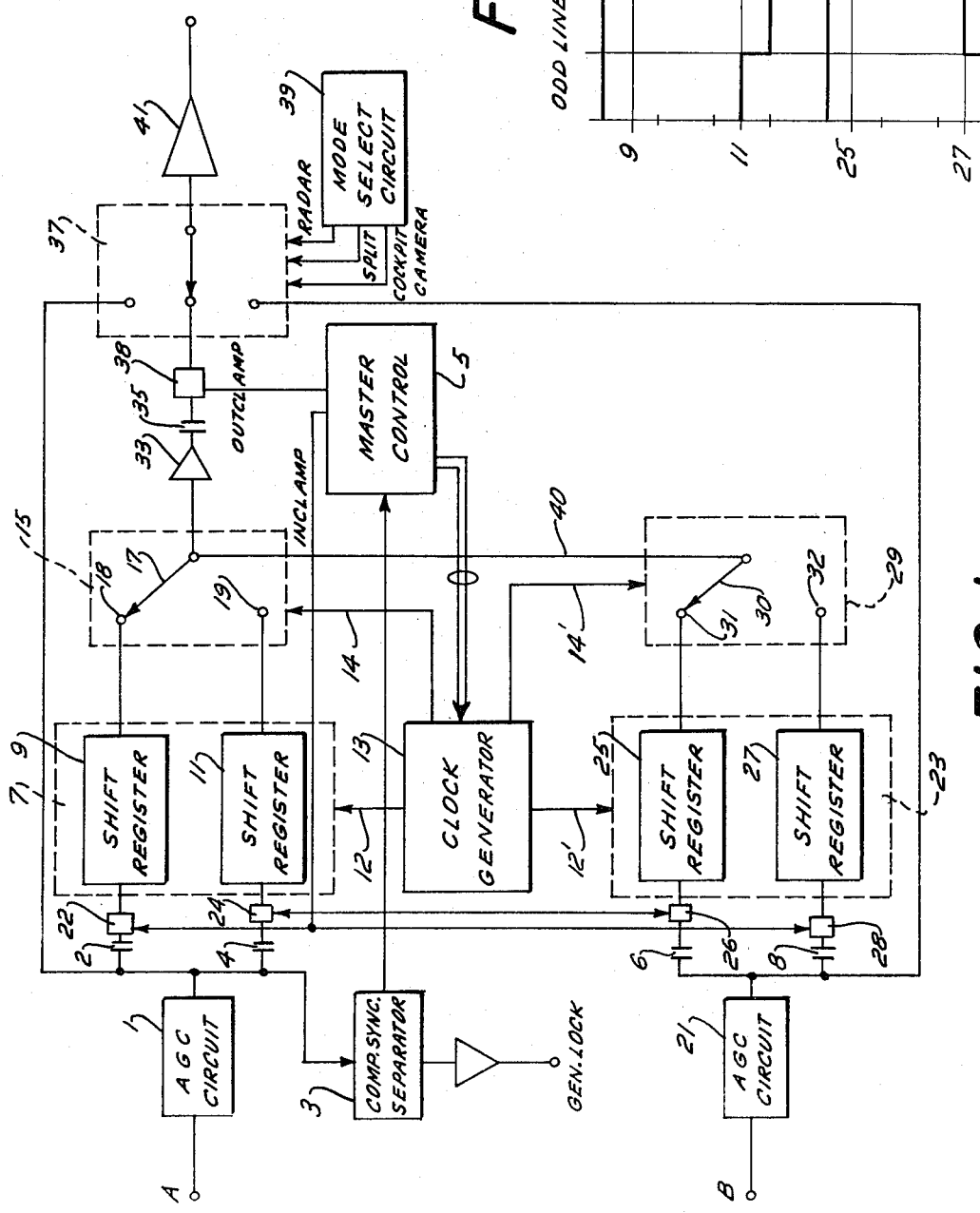
FIG. 1 is a block diagram depicting the preferred embodiment of the invention.

FIG. 1 shows the invention in block diagram form. Although it will be apparent that any two independently derived images compatible with accepted television standards, such as RS 170, can be juxtaposed on a television screen in accordance with the principles of the invention, the drawings and related disclosure which follows will refer to a radar unit and a cockpit camera as the sources of the video signals since the preferred embodiment is contemplated for use in combat aircraft. The circuit receives at A the radar composite video signal. This signal can be obtained directly from a radar unit which is adapted to provide video signals compatible with an RS 170 video source or from a television camera aimed at the radar scope. This signal includes horizontal and vertical sync information which is why the term "composite" is appropriately used. Such signals can have a 1 to 10 volt peak to peak voltage and are therefore processed by an automatic gain control (AGC) circuit 1 which provides a regulated 1.6 volt peak to peak voltage. The AGC output signal includes both horizontal sync and vertical sync information which are separated by composite sync separater 3 for input to the cockpit camera (not shown) and master control 5. The sync signal supplied to the cockpit camera is utilized to synchronize the camera to the radar signal by any well known technique such as, for example, gen lock. The utilization by the master control of the sync signals will be discussed below.

The AGC output, which of course is an analog signal, is input to analog memory 7 such as a charge coupled device (CCD) shift register. In the preferred embodiment the analog memory is a Fairchild CCD321 having shift registers 9 and 11. At the input of each register, in accordance with standard practice, is a capacitor to block stray d.c. levels. Two shift registers connected to the radar signal are required because one is storing samples while the other is simultaneously outputting its samples as discussed in greater detail below.

The CCD memory samples the analog video signal at a selected frequency and stores the analog sample. The analog sample is then shifted from input to output at the clock frequency in the manner common to digital shift registers. However, the analog value of the samples is retained as it is being thus shifted.

Master control 5 outputs a number of timing signals, together represented as bundle 21, to clock generator 13. The 52.3 microseconds of active video plus one microsecond of pre-video (for black reference) in the RS 170 format are divided into 455 time units and each register has a corresponding 455 bit capacity. The 455 bits are clocked into and out of the register under the control of output 12 of clock generator 13. Output 14 of clock generator 13 controls switch 15. Switch 15, represented as a single pole, double throw switch, is connected to the output of shift registers 9 and 11. This switch is, in the preferred embodiment, an electronic switch but for the purpose of simplifying the explanation at this stage of the disclosure, a contact switch is shown instead. Pole 17 of switch 15 will alternate between contacts 18 and 19 of switch 15 at a rate set by the master control 5 to output the contents of each register at the appropriate time. The specifics of storage and retrieval of these analog samples forms an important part of the invention and will be dealt with in greater detail below.

At this point, it is appropriate to discuss the circuitry responsive to the cockpit camera signals. It will be apparent that this circuitry is very similar to that responsive to the radar video signals. More specifically, AGC 21 is connected to input B which receives the cockpit camera composite video signal. The output of the AGC is connected to analog memory 23 which is also, in the preferred embodiment, the dual shift register Fairchild CCD321 charge coupled device. Shift registers 25 and 27 of memory 23 each have a 455 bit capacity as is the case with registers 9 and 11. The output of shift registers 25 and 27 is connected to switch 29 which is also of the single pole double throw variety. Pole 30 alternates between contacts 31 and 32 of switch 29 under the control of output 14' from clock generator 13. In this manner, the contents of only one shift register are outputted while the other is simultaneously storing samples.

Figure 3:
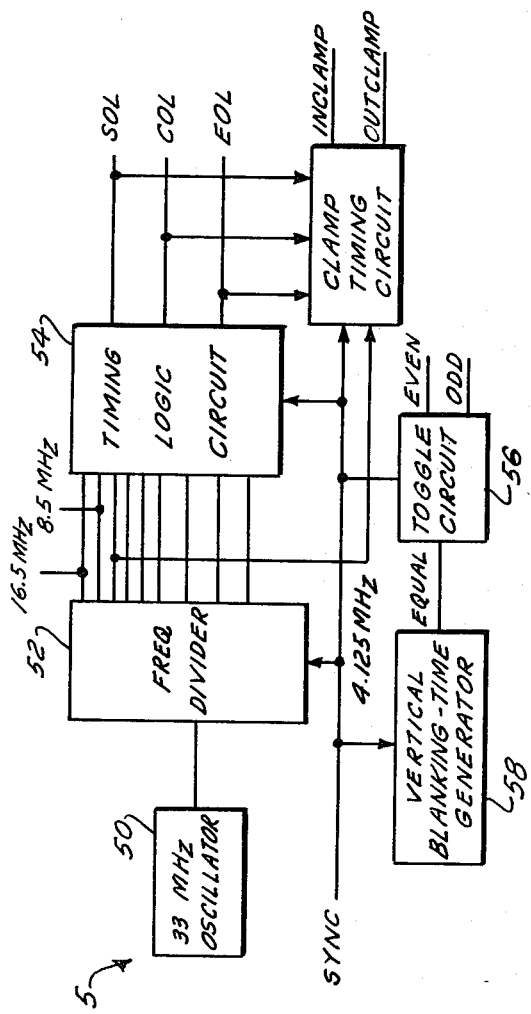
FIG. 3 is a block diagram showing the master control block of FIG. 1 in greater detail.

Master control 5, which is discussed in greater detail with relation to FIG. 3, functions primarily to generate timing signals and is synchronized to the incoming video signals by the horizontal and vertical sync signals it obtains from composite sync separater 3. The timing signals are combined by logic circuitry in the clock operator to form the clock signals. In addition, master control 5 provides a horizontal clamp signal to clamp circuits 22, 24, 26 and 28 (for black reference) at the input of each shift register, respectively. Clamp circuits 22, 24, 26 and 28 are series connected to capacitors 2, 4, 6 and 8, master control 5 also provides a horizontal clamp signal to clamp circuit 38. Circuit 38 is series connected with amplifier 33 and capacitor 35 to the combined outputs of switches 15 and 29. The outputs of switches 15 and 29 are combined by line 40 connecting the fixed contact of the moveable pole.

Switch 37 is a single pole, triple throw switch which is connected to the outputs of the AGC 1, AGC 21 and op amp 32. Switch 37, is in the preferred embodiment, an electronic switch but, here again, it is shown as a contact switch for purposes of simplifying this description. The pole position of switch 37 is controlled by external mode-select circuit 39 to select a picture showing solely the radar output, solely the cockpit camera output, or the combined (multiplexed) radar and cockpit camera picture. The signals generated by this circuit to set each mode is, respectively, RADAR, COCKPIT CAMERA, and SPLIT. The output of switch 37 is coupled via buffer amplifier 41 to the output terminal of the depicted circuit which, in turn, is used as an input to a television monitor or to a video tape recorder for recording and later display on a video monitor.

Turning now to the technique used for compressing the radar and cockpit camera pictures with the invention so that both images can simultaneously be juxtaposed on a single screen, the key element is the timing used for inputting and outputting samples into the analog memories. More specifically, output 12 of clock generator 13 clocks the 455 samples into the analog shift registers at 8.25 MHz and outputs the 455 samples at a frequency 16.5 MHz. Since the same information is retrieved from memory at twice the frequency at which it is stored, a 2 to 1 picture compression is thus obtained. A similar timing control is applied to memory 23 by output 12' of clock generator 13.

Figure 2:
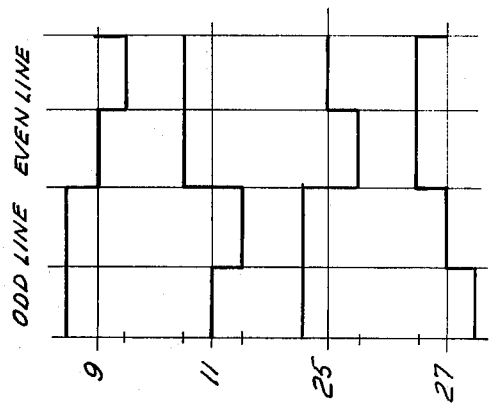
FIG. 2 is a timing diagram which symbolically depicts the storing and retrieval of image samples by the circuit of FIG. 1.

The timing diagram of FIG. 2 may be helpful in understanding how the video signals from the radar unit and cockpit camera are stored, retrieved and combined by the invention. Four horizontal reference lines labelled 9, 11, 25 and 27 are shown which correspond by number to the four shift registers. A line drawn above the reference line is indicative of sample storage, a line drawn below the reference line is indicative of sample retrieval, and a line along the reference line indicates that the shift register is inactive. The interval between successive vertical lines represents the time required for the raster scan to travel to the center of the screen, or 53.3/2 microseconds. Thus, two successive intervals represents one horizontal line. The two such lines on FIG. 2 have been marked to show whether an even or odd numbered line is being scanned on the screen. It will be readily apparent that for the time period 0 to 53.3 microseconds in which an odd line is being scanned, shift registers 9 and 25 are storing samples whereas shift registers 11 and 27 are outputting samples. Samples are clocked into shift registers 9 and 25 for this entire period at a frequency of 8.25 MHz from outputs 12 and 12' of clock generator 13. However shift registers 11 and 27 will clock out samples for only selected portions of this period. More specifically, register 11 remains inactive for the first half of this period whereas it clocks out all its stored 455 samples during the second half of this period at a frequency of 16.5 MHz. Register 27, on the other hand, clocks out all its 455 samples during the first half of the period whereas it remains inactive for the second half. For the even line scan, the reverse arrangement applies with registers 11 and 27 storing samples and registers 9 and 25 clocking them out.

The combined signal displayed on the television screen will be the cockpit camera output for the first half of the raster line whereas the second half of the line will display the output from the radar unit. Thus, the images from the radar and the camera will be juxtaposed simultaneously on the television monitor after the disclosed picture compression has taken place without loss of any video information. Although horizontal distortion will clearly take place due to the compression, the retention of all video information is considered more significant for the intended purpose and consequently the distortion is tolerated. Moreover, such distortion is not of such a magnitude as to render the picture unintelligible. In fact, in the environment contemplated for this invention, namely combat aircraft, the distortion does not pose any problem in interpreting the displayed images.

Now that the invention has generally been explained with the aid of FIG. 1 and the timing diagram of FIG. 2, the following discussion will proceed to a more detailed breakdown of the major components of the circuitry. However, it must be noted that even the more detailed circuitry to be discussed below does not include various standard components such as those required for voltage supply, stabilization of logic circuits, and driver stages. Reference to these components has been deleted due to the standard nature of such components and, therefore, the relative ease with which one skilled in the art can perceive the need for these components, and how they are connected in the circuits. More importantly, to simplify to the reasonable extent possible what would otherwise be a very complex schematic.

FIG. 3 depicts a block diagram breakdown of master control 5. Oscillator 50 provides a stable 33 MHz signal from which the various clocks utilized in the circuitry and described below are derived. Frequency divider 52 divides the oscillator frequency into 11 submultiple frequencies. The latter are fed into timing logic circuit 54 which comprises standard gating circuits to generate a start of line (SOL) signal, a center of line (COL) and an end of line (EOL) signal. These signals perform the exact functions implied by their names. Thus, in response to the timing units provided from the frequency divider, the SOL signal is provided after a suitable delay allowing for horizontal clamp (black reference), and the EOL signal is provided 455 timing units later, with the COL signal being provided half way between. Master control 5 also generates EVEN and ODD signals from toggle circuit 56. These indicate whether an even line or an odd line is being scanned. One of the inputs to toggle circuit 56 is from vertical blanking time generator 58. It deactivates the toggle circuit during the vertical flyback and then reactivates it for the entire field. Clamp timing circuit 60 generates INCLAMP and OUTCLAMP signals in response to the outputs of timing logic circuit 54 and a 4.125 MHz frequency signal from frequency divider 52. The function of these output signals is standard and has been mentioned above. Components 52, 54, 56, 58, and 60 of master control 5 are all referenced to the sync signal obtained from composite sync separator 3.

Although only the logic high version of the various signals generated by master control 5 are shown in FIG. 3, it should be understood that the inversions of these signals are also available. The inverted signals are utilized in FIG. 4 and are represented there by the conventional line over the symbol of the signal such as "$\overline{SOL}$".

Figure 4:
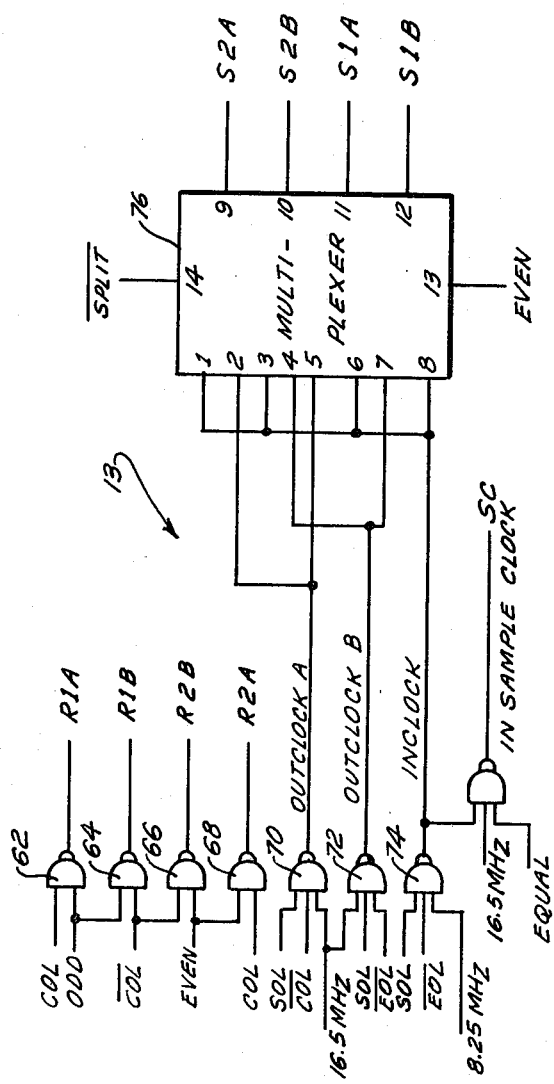
FIG. 4 shows partially schematically and partially in block diagram from details of the clock generator of FIG. 1.

FIG. 4 discloses in more detail the components of clock generator 13. NAND gates 62, 64, 66, and 68 generate signals which control the switch (see FIG. 5) connected to each of the outputs of shift registers 9, 11, 25, and 27. NAND gate 62 is responsive to signals COL and ODD to generate output R1A. NAND gate 64 is responsive to signals ODD and $\overline{COL}$ to generate signal R1B. NAND gate 66 is responsive to signals $\overline{COL}$ and EVEN to generate signal R2B. NAND gate 68 is responsive to signals EVEN and COL to generate signal R2A. Thus, when toggle circuit 56 indicates that an odd line is being scanned, NAND gates 62 and 64 have a logic high at their respective ODD inputs. In the first part of the scan line, i.e. when $\overline{COL}$ is high, output signal R1B will be generated (i.e. switch to its logic low) whereas in the second half of the scan line signal COL will be high and output R1A will be generated. Similarly, when toggle circuit 56 indicates that an even line is being scanned, signal R2B will be generated for the first half of the line while signal R2A will be generated for the second half of the line. The specific utilization of these signals in the memory will be explained with reference to FIG. 5.

NAND gates 70, 72, and 74 in cooperation with multiplexer logic circuit 76 generate the clock signals for controlling the storage of samples into and retrieval from memories 7 and 23. More specifically, NAND gate 70 is responsive to signals SOL, $\overline{COL}$, and a 16.5 MHz frequency to generate OUTCLOCK A. NAND gate 72 is responsive to the 16.5 MHz signal as well as to COL and $\overline{EOL}$ to generate OUTCLOCK B. NAND gate 74 is responsive to SOL, $\overline{EOL}$, and an 8.25 MHz frequency signal to generate INCLOCK. The OUTCLOCK A, OUTCLOCK B, and INCLOCK signals are input to multiplexer 76. The latter is a quad, two input logic circuit. This means that it has four two input circuits each of which generates an output signal. Thus, the inputs at pins 1 and 2 generate an output at pin 9, the inputs at pins 3 and 4 generate an output at pin 10, the inputs at pins 5 and 6 generate an output at pin 11, and the inputs at pins 7 and 8 generate an output at pin 12. The input at pin 13 controls whether the output sees the top or bottom signal at the input. Thus, if this input is high then the output at pin 9 will be the same as the input at pin 1, the output at pin 10 will be the same as the input at pin 3 and so on for outputs 11 and 12. Similarly, if the input at pin 13 is low, the output at pin 9 will be the same as the input at pin 2, the output at pin 10 will be the same as the input at pin 4 and so on for outputs 11 and 12. The input at pin 13 is the EVEN signal which means that when toggle circuit 56 generates an EVEN signal at a logic high the inputs at input pins 1, 3, 5, and 7 will be reflected at outputs 9, 10, 11 and 12, respectively. Conversely, when toggle circuit 56 generates an ODD signal, which means that the EVEN signal is at a logic low, the inputs at pins 2, 4, 6, and 8 will be reflected at output pins 9, 10, 11, and 12, respectively.

As far as the outputs of multiplexer 76 are concerned, it will be readily apparent that for an EVEN scan line, outputs S2A and S2B will be an 8.25 MHz signal for the entire scan line. These signals, then, store samples into the shift registers to which they are connected, respectively. For an ODD scan line signals S1A and S1B will receive the 8.25 MHz signal to store information in the shift register to which they are connected, respectively. The OUTCLOCK A signal provides a 16.5 MHz signal for the first half of the scan line whereas the OUTCLOCK B signal provides the same frequency signal but only for the second half of the scan line. Thus, for an even line, output S1A will control retrieval of samples during the first half of the scan line whereas output S1B will control retrieval for the second half of the scan line. Similarly, for an odd scan line, output S2A will control retrieval for the first half of the scan line whereas output S2B will control retrieval for the second half of the scan line. Further details with regard to the use of these signals will be provided below with reference to FIG. 5.

The final clock produced by clock generator 5 as shown in FIG. 4 is called SC. This signal controls the sampling of the analog signal obtained from AGC circuit 1 at the input of all the shift registers. It is responsive to the 8.25 MHz INCLOCK signal from NAND 74, a 16.5 MHz signal and the $\overline{\text{EQUAL}}$ signal from vertical blanking time generator 58. It is readily seen that the SC signal is a 8.25 MHz square but with each halfwave having only half its normal width due to the presence of the 16.5 MHz signal at the input. This narrow pulse provides the 455 analog samples for storage by the shift registers. The connection of the signal to the memories is also described further below.

Figure 5:
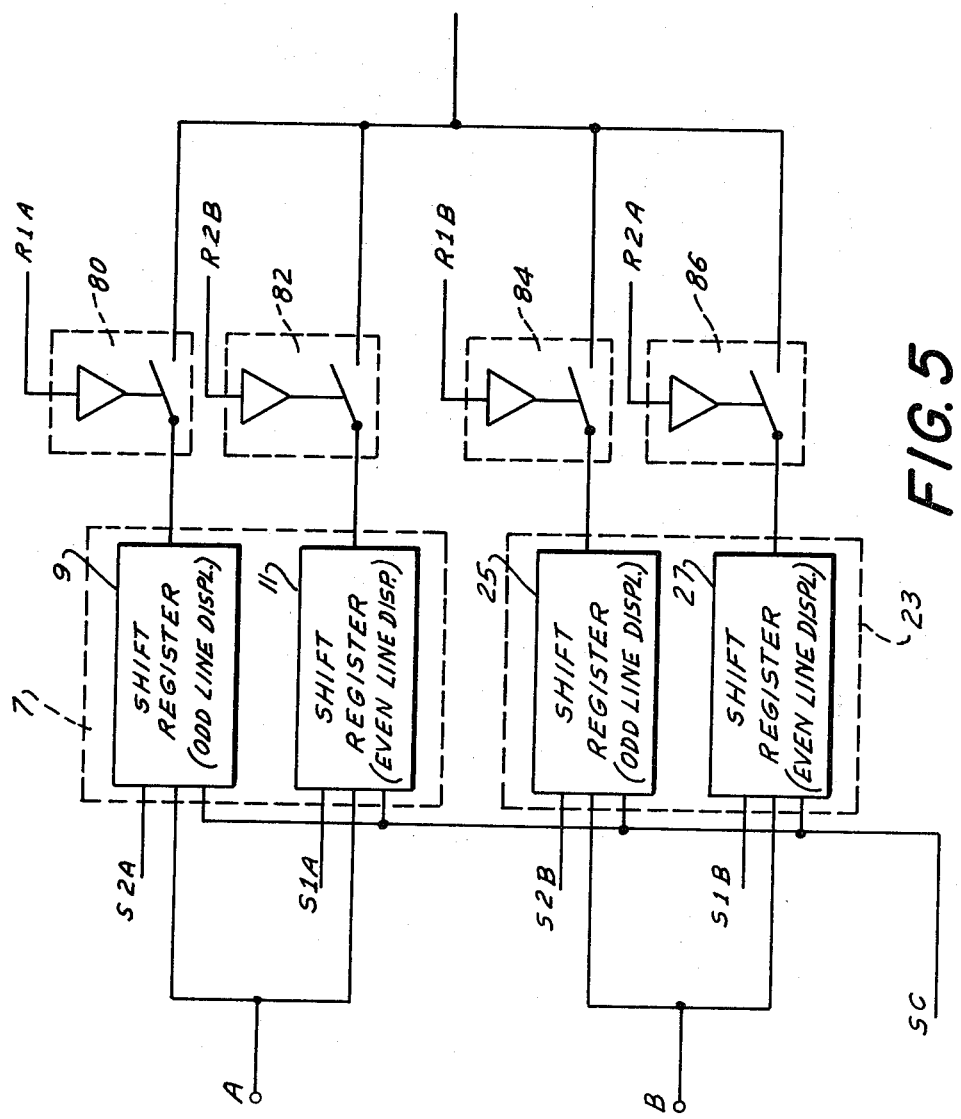
FIG. 5 is a block diagram of the analog memory of FIG. 1 showing how the timing clock signals from the clock generator are connected to the memory.

FIG. 5 shows how the various clock signals are employed to control the storage and retrieval of samples from memories 7 and 23. More specifically, the radar video signal is input at terminal A for storage by shift registers 9 and 11. The cockpit camera video signal is input at terminal B for storage by shift registers 25 and 27. At the output of shift registers 9, 11, 25, and 27 are connected switches 80, 82, 84 and 86, respectively. Switches 80 and 82 correspond to switch 15 in FIG. 1 while switches 84 and 86 correspond to switch 29 in FIG. 1. Switches 80, 82, 84, and 86, are shown as contact type single pole, single throw switches to the pole of which is connected an amplifier which controls its position. This is a simplified version of what in actuality is an electronic switch and is utilized here to facilitate the explanation of the invention. Signal SC is connected to each of the shift registers. It activates appropriate circuitry in the Fairchild CCD321 device which is believed to require no further explanation beyond what was mentioned regarding the signal above.

Signals S2A, S1A, S2B, and S1B, are connected to the clock inputs of shift registers 9, 11, 25, and 27. Keeping in mind what was mentioned earlier as to the relative timing of these signals, it will be readily apparent that, for an even line, signal S2A will clock samples into shift register 9 at 8.25 MHz. At the same time, switch 80 is held open by signal R2A to inhibit the output of the register from being displayed. While shift register 9 is storing samples of the radar signal, shift register 25 is storing cockpit camera video samples under control of clock S2B which is operating at a frequency of 8.25 MHz. Also, switch 84 will be held open under control of signal R2B. While shift registers 9 and 25 are storing information, shift registers 11 and 27 should be outputting information. Under control of signal S1A, shift register 11 will be clocking out information for the first half of the scan line at a rate of 16.5 MHz. Switch 82 at its output will be closed under the influence of signal R1A. For the second half of the scan line shift register 11 will be inactive since clock S1A is terminated. Shift register 27 will be outputting its stored samples for the second half of the scan line due to the presence of clock S1B at its input operating at a frequency of 16.5 MHz. Switch 86 at its output will be closed under the influence of signal R1B. For the first half of the scan line, shift register 27 was inactive since no clock signal S1B was present.

For an odd line, registers 9 and 25 will be outputting information whereas shift registers 11 and 27 will be inputting samples. More specifically, signal S2A will clock samples out of shift register 9 at a frequency of 16.5 MHz for the first half of the scan line. Shift register 25 will be inactive since no OUTCLOCK B signal is present. For the second half of the scan line, the OUTCLOCK A signal is terminated and OUTCLOCK B signal S2B will clock samples out of shift register 25 at 16.5 MHz. As to shift register 11, signal S1A clocks samples into storage at a frequency of 8.25 MHz. Signal S1B clocks samples into shift register 27 also at 8.25 MHz. Switches 84 and 80 will be closed, respectively, for the first and second halves of the scan line. Switches 82 and 86 will remain open for the entire duration of the scan line.

It should be clear from all of the above that the invention provides a compact, relatively low cost and light, yet effective, apparatus for producing a compressed picture. This is achieved primarily by resort to analog memory for storing the analog video signals in place of the complex circuitry used in the art previously which relied on A/D circuitry and digital memory Moreover, two compressed pictures derived from two independent video sources are elegantly combined by a timing circuit which generates eight clock signals having a relatively complex timing relationship with digital circuitry employing minimal components to reduce size, weight and cost. These factors are important generally but all the more so in the aircraft environment, discussed above, contemplated for the preferred embodiment of the invention.

Although the above discussion describes the preferred embodiment of the invention, it will be readily apparent that various modifications of the described circuits are possible. For example, one of the sources of video signals can incorporate some of the components of the disclosed circuit. More specifically, should the cockpit camera be a CCD type camera, the camera itself can act as memory 23. Thus a separate memory would not be required. Picture compression of the image detected by the CCD camera would thus be achievable by clocking out the information stored in the CCD camera at twice the normal rate. Furthermore, the digital gating circuitry used to derive the various clock signals should be looked upon as exemplary since many other ways of deriving such signals will readily occur to one familiar with this art. These and other modifications should all be considered as part of the invention as defined by the following claims.

We claim:

1. Apparatus for producing a simultaneous display of juxtaposed pictures of two independently derived images on a raster scan television monitor comprising:
    a. first and second analog memory means for storing analog video signals representative of substantially all of each of said images;
    b. first timing means coupled to said first and second analog memory means for storing said video signals at a given frequency and for retrieving said stored analog video signals at a frequency higher than said given frequency; and
    c. means for combining the outputs of said first and second analog memory means to juxtapose the pictures represented by the video signals stored in each analog memory on said television monitor.

2. The apparatus of claim 1 further comprising a first and a second source of video signals coupled, respectively, to the first and second analog memory means.

3. The apparatus of claim 1, wherein the analog memory means comprises four analog shift registers with each having its clock input coupled to the output of said first timing means.

4. The apparatus of claim 3, wherein said first timing means includes a master control means for generating a start of line signal (SOL), a center of line signal (COL), an end of line signal (EOL), and EVEN and ODD signals to represent the number of the raster line being scanned.

5. The apparatus of claim 4, wherein said first timing means further includes a clock generator means coupled to the master control means for combining given frequency signal, the higher frequency signal, and the SOL, COL, EOL, EVEN and ODD signals to generate said four clock outpout signals coupled, respectively, to the four shift registers.

6. The apparatus of claim 5, wherein the given frequency is 8.25 MHz and the higher frequency is 16.5 MHz.

7. The apparatus of claim 6, further comprising four switch means coupled, respectively, to the output of each shift register and wherein the clock generator means generates four switching signals in response to signals COL, EVEN, and ODD, said switching signals being coupled to the four switches, means, respectively, to pass the retrieved stored samples only for a selected half of a scan line.

8. The apparatus of claim 7, further comprising means for synchronizing the first and second sources of video signals.

9. The apparatus of claim 8, wherein the analog shift registers are charge coupled devices.

10. The apparatus of claim 9, wherein said clock generator means produces a sampling clock connected to a sampling clock input in each analog shift register for sampling the video signals from said first and second sources, respectively.

11. A method for producing a simultaneous display of juxtaposed pictures of two independently derived images on a raster scan television monitor comprising the steps of:
    a. obtaining first and second video signals;
    b. storing substantially all of each of said signals in an analog memory at a given frequency;
    c. retrieving said signals at a frequency higher than said given frequency;
    d. combining the retrieved first and second signals; and
    e. displaying the combined signals so that the retrieved first video signals are displayed on a first part of the raster scan line and the retrieved second video signals are displayed on a subsequent second part of the scan line.

* * * * *

UNITED STATES PATENT AND TRADEMARK OFFICE
CERTIFICATE OF CORRECTION

PATENT NO. : 4,399,462

DATED : August 16, 1983

INVENTOR(S) : Harvey L. Balopole et al

It is certified that error appears in the above-identified patent and that said Letters Patent are hereby corrected as shown below:

Column 2, line 25, insert -- to -- between "is" and "reduce".

Column 2, line 67, "from" should read -- form --.

Column 3, line 28, "separater" should read -- separator --.

Column 3, line 52, "21" should read -- 20 --.

Column 4, line 42, "32" should read -- 33 --.

Column 6, line 68, "multiflexer" should read -- multiplexer --.

Column 7, line 28, insert a comma between "line" and "signals".

Column 7, line 48 "$\overline{EQUAL}$" should read -- EQUAL --.

Column 8, line 14, "R2A" should read -- R1A --.

Column 8, line 20, "R2B" should read -- R1B --.

Column 8, line 26, "R1A" should read -- R2B --.

Column 8, line 32, "R1B" should read -- R2A --.

Column 8, line 47, "84" should read -- 80 --.

Column 8, line 47, "80" should read -- 84 --.

Column 8, line 57, insert a period between "memory" and "Moreover".

UNITED STATES PATENT AND TRADEMARK OFFICE
CERTIFICATE OF CORRECTION

PATENT NO. : 4,399,462

DATED : August 16, 1983

INVENTOR(S) : Harvey L. Balopole et al

It is certified that error appears in the above-identified patent and that said Letters Patent are hereby corrected as shown below:

Figure 1, the line from Master Control 5 to Clock Generator 13 should be labelled -- 20 --.

Figure 3, the Clamp Timing Circuit should be labelled -- 60 --.

Figure 4, the input to NAND gate 72 labelled "SOL" should be -- COL --.

Claim 1, column 9, line 32, insert -- means -- between "memory" and "on".

Claim 5, column 10, line 6, "outpout" should read -- output --.

Claim 7, column 10, line 16, "switches, means," should read -- switch means, --.

Signed and Sealed this

Third Day of January 1984

[SEAL]

Attest:

GERALD J. MOSSINGHOFF

Attesting Officer

Commissioner of Patents and Trademarks